United States Patent [19]

Grudowski et al.

[11] 4,104,731

[45] Aug. 1, 1978

[54] ASYNCHRONOUS COUPLING OF DATA BETWEEN A WORD-ORIENTED I/O MODULE AND THE MEMORY OF A PROGRAMMABLE CONTROLLER

[75] Inventors: Raymond A. Grudowski, South Euclid; Odo J. Struger, Chagrin Falls, both of Ohio

[73] Assignee: Allen-Bradley Company, Milwaukee, Wis.

[21] Appl. No.: 696,138

[22] Filed: Jun. 14, 1976

[51] Int. Cl.² .................... G06F 9/06; G06F 3/00; G06F 15/46

[52] U.S. Cl. .................................................. 364/900

[58] Field of Search .................... 340/172.5; 445/1; 235/151.1, 151.11; 364/200 MS File, 900 MS File, 107, 117

[56] References Cited

U.S. PATENT DOCUMENTS

| | | | |
|---|---|---|---|
| 3,793,625 | 2/1974 | Pomella et al. | 340/172.5 |
| 3,829,842 | 8/1974 | Langdon et al. | 340/172.5 |
| 3,909,891 | 9/1975 | Tokura et al. | 340/172.5 |
| 3,942,158 | 8/1976 | Dummermuth | 340/172.5 |
| 3,961,200 | 6/1976 | Dute | 340/172.5 X |

Primary Examiner—Mark E. Nusbaum
Attorney, Agent, or Firm—Quarles & Brady

[57] ABSTRACT

A programmable controller includes a controller processor which operates in response to a control program to transfer command words stored in a data table to an input/output image table in the controller memory. An input/output scanner circuit operates asynchronously with respect to the controller processor to couple command words in the output image table to one or more of a plurality of word-oriented I/O modules and to couple command words from an I/O module to the input image table. A pulse module is described for receiving such command words and controlling the operation of a stepping motor and an analog output module is described which converts a digital number in such command words to an analog output signal.

8 Claims, 4 Drawing Figures

| ADDRESS | CONTENTS | |
|---|---|---|
| 023 | 16-BIT OUTPUT WORD COUPLED TO PULSE MODULE | OUTPUT IMAGE TABLE 2 |
| 123 | 16-BIT INPUT WORD COUPLED FROM PULSE MODULE | INPUT IMAGE TABLE 3 |
| ABC | LEAST SIGNIFICANT RATE COMMAND WORD | DATA TABLE 4 |
| DEF | MOST SIGNIFICANT RATE COMMAND WORD | |
| GHI | LEAST SIGNIFICANT POSITION COMMAND WORD | |
| JKL | MOST SIGNIFICANT POSITION COMMAND WORD | |
| MNO | START COMMAND | |
| YZa | NO-OPERATION | |
| TUV | PULSE MODULE SEQUENCE STEP NUMBER | TIMERS & COUNTERS |
| 2WX | ELAPSED TIME | |
| 3WX | PRESET TIME (.1 SECONDS) | |

Fig. 4

ASYNCHRONOUS COUPLING OF DATA BETWEEN A WORD-ORIENTED I/O MODULE AND THE MEMORY OF A PROGRAMMABLE CONTROLLER

BACKGROUND OF THE INVENTION

The field of the invention is industrial digital control systems, and particularly, programmable controllers such as that disclosed in U.S. Pat. No. 3,942,158 issued Mar. 2, 1976, and entitled "Programmable Logic Controller".

Programmable controllers are typically connected to industrial equipment such as assembly lines and machine tools to sequentially operate the equipment in accordance with a stored control program. In programmable controllers such as that disclosed in the above cited patent, for example, the control program is stored in a random access memory and includes instructions which are executed in rapid sequence to examine the condition of selected sensing devices on the controlled equipment and instructions which energize or deenergize selected operating devices on the controlled equipment contingent upon the status of one or more of the examined sensing devices.

Programmable controllers are distinguishable in both structure and application from process controllers which employ general purpose digital computers to control industrial equipment and processes. Whereas the primary function of a process controller may be to monitor a number of analog signals and control a number of analog operating devices, the primary function of programmable controllers is to monitor large numbers of single-bit digital devices, such as limit switches, and control a large number of single-bit operating devices such as solenoids and motor starters. As a result, the processor, or central logic unit of a programmable controller is typically less complex, less powerful and less costly than the processor of a general purpose computer, both because it processes single bits rather than words and because it is not called upon to perform substantial arithmetic functions. On the other hand, due to the large number of discrete sensing and operating devices connected to a programmable controller and the severe environment in which they are typically located, the I/O interface circuitry which couples industrial equipment to a programmable controller processor may be elaborate. In the above cited patent, for example, the I/O interface circuitry is coupled to the programmable controller memory through a unique input/output scanner circuit which operates asynchronously with respect to the controller processor to couple digital data between the electrically hostile industrial environment and the controller memory.

As programmable controllers grow in size and capability, they are finding increased application in industrial systems and processes which include analog devices and positioning devices which have heretofore been controlled by process controllers or special purpose hardwired control systems. Such devices are word oriented unlike the bit-oriented devices typically controlled by a programmable controller and special measures must, therefore, be taken to interface these word-oriented devices with a programmable controller.

SUMMARY OF THE INVENTION

The present invention relates to a word-oriented input/output module for a programmable controller and to a means for asynchronously coupling data between such a module and a data table associated with the programmable controller processor. More particularly, the present invention resides in a programmable controller having a memory which stores command words and an input/output scanner circuit which periodically reads selected command words out of said memory and couples them to an associated word-oriented input/output module through a rack data bus, and in which the module includes a plurality of circuit elements, each coupled to the rack data bus to receive a multi-digit number contained within the command words and circuit means connected to receive an identification code within each command word and in response thereto enable one of the circuit elements to operate on the multi-digit number associated with the identification code.

A general object of the invention is to provide a word-oriented input/output module for a programmable controller which employs an input/output scanner circuit to couple data between the controller memory and the input/output modules. Rather than coupling the word-oriented module directly to the controller processor or its associated memory, the present invention contemplates a word-oriented module which is connected to the rack data bus which serves other, more conventional I/O modules. The word-oriented module of the present invention may thus be physically mounted in an I/O interface rack with the other I/O modules without the addition of any special purpose apparatus or additional electrical connections. This arrangement also facilitates the use of such a word-oriented I/O module in an interface rack which is located remotely from the programmable controller processor and associated memory as disclosed in U.S. Pat. No. 3,997,879 entitled, "Fault Processor for Programmable Controller with Remote I/O Interface Racks".

Another object of the invention is to interface a word-oriented input/output module with a programmable controller without adding special purpose hardware to the controller processor or input/output scanner circuit.

Yet another object of the invention is to provide a word-oriented I/O module for a programmable controller such as that described in the above cited U.S. patent. The input/output scanner circuit is operable to periodically and continuously read command words for the word-oriented I/O module from a single location in an output image table of the controller memory. As a result, the command words stored in the data table which are to be transferred to the word-oriented I/O module must first be written into the single location in the output image table one at a time. A timer is employed to insure that each command word thus written into the single location of the output image table remains thereat long enough for the asynchronously operating input/output scanner circuit to couple it at least once to the word-oriented I/O module. Because the input/output scanner circuit is operated asynchronously with respect to the processor which manipulates the command words in the controller memory, multiple transfers of the same command word may occur while it is in the single memory location of the output image table. Hence, the identification code becomes the only means for the I/O module to identify which circuit elements are to employ the command word. A more specific object of the invention is to provide an analog output module for a programmable controller which may be mounted in an interface rack with other I/O modules.

Yet another more specific object of the invention is to provide a pulse module for a programmable controller which may be mounted in the interface rack with other controller I/O modules.

The foregoing and other objects and advantages of the invention will appear from the following description. In the description reference is made to the accompanying drawings which form a part hereof, and in which there is shown be way of illustration a preferred embodiment of the invention. Such embodiment does not necessarily represent the full scope of the invention, however, and reference is made to the claim herein for interpreting the breadth of the invention.

BRIEF DESCRIPTION OF THE DRAWINGS

FIG. 4 is a schematic representation of the contents of the controller memory.

DESCRIPTION OF THE PREFERRED EMBODIMENT

Figure 1:
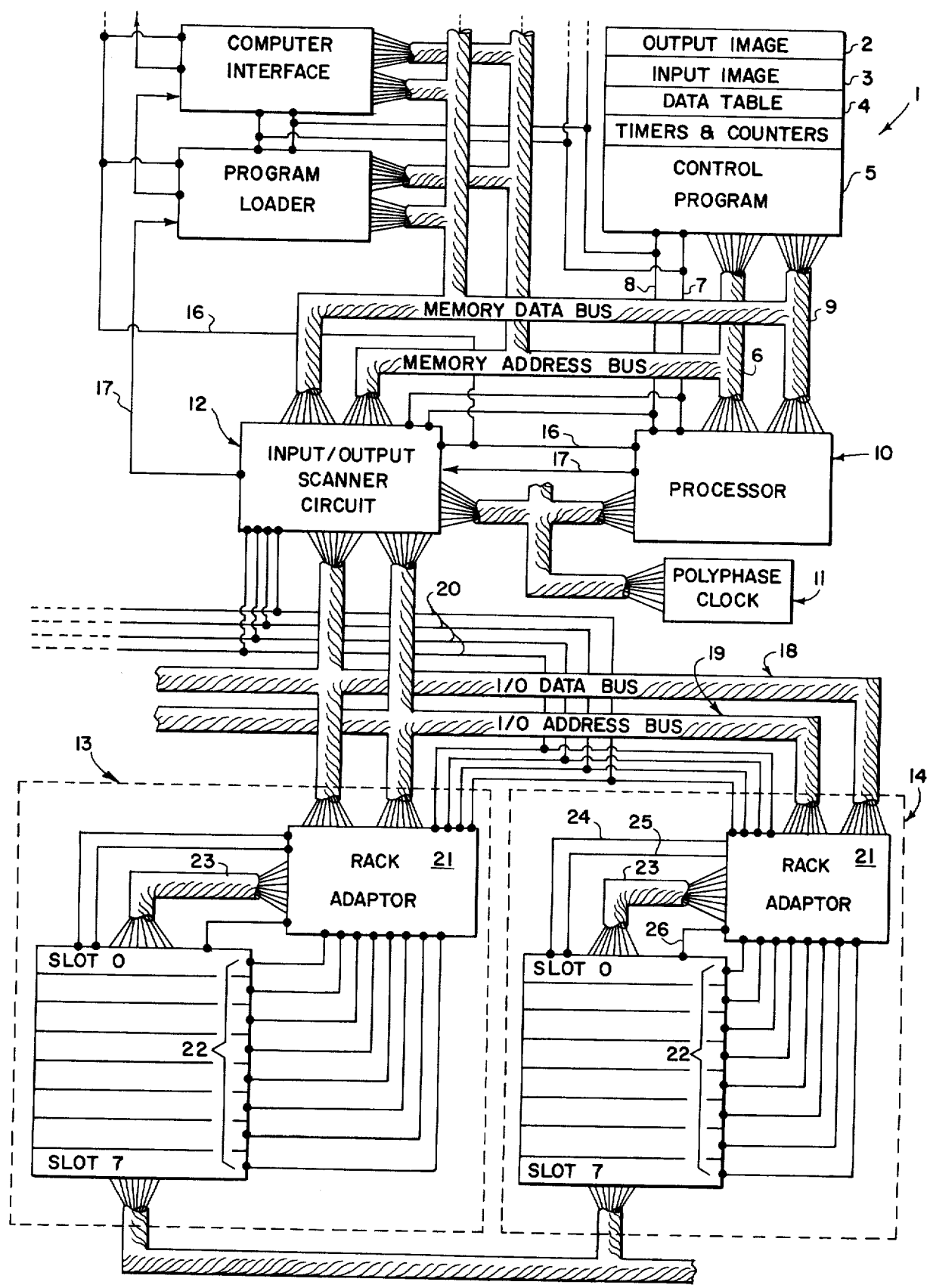
FIG. 1 is a block diagram of the programmable controller which incorporates the present invention.

Referring to FIG. 1, the programmable controller which incorporates the present invention has a total capacity of 1,024 single-bit outputs and 1,024 single-bit inputs which are connectable to control a machine. It includes a random access read/write memory 1 which has an eighteen-bit word length and which may include from 2,048 to 8,192 separately addressable lines depending upon the size of the control program which it is to store. Two bits in each word stored in the memory 1 are used for parity checking, and thus sixteen data bits are stored on each line of the memory 1. An output image table 2 is stored on the first sixty-four lines of the memory 1 and is addressable with the octal addresses 000-077, an input table 3 is stored on the next sixty-four lines of the memory 1 and is addressable with the octal addresses 100-177, a data table 4 and preset and accumulated values of counters and timers are stored on the next 128 lines of the memory 1 and are addressable with the octal addresses 200-377. The remaining lines of the memory 1 contain a control program 5 in which each program instruction is addressable with an octal address of 400 or greater.

Selected data is read from the memory 1 by applying the octal address of the line containing the data to a memory address bus 6 and applying a logic high voltage to a read/write line 7. The memory 1 is cycled by applying a logic high pulse to a memory cycle line 8 and the addressed word is read out on a memory data bus 9. A word is loaded, or written into a selected line of the memory 1 by applying the octal address of that line to the memory address bus 6, applying a logic low voltage to the read/write line 7 and applying a logic high voltage pulse to the memory cycle line 8. The data word appearing on the memory data bus 8 during the one-microsecond cycle time of the memory 1 is written into the selected line of the memory 1.

The control program 5 is executed by a processor 10 which connects to the memory buses 6 and 9 and to the control lines 7 and 8. In response to one megahertz clock pulses generated by a polyphase clock 11, the processor 10 continuously and sequentially reads out the instructions of the control program 5 from the memory 1, and in response to an operation code contained within each program instruction, it performs the operations necessary to carry out the control functions. Such operations include, for example, examining a status bit in the input image table 3 or setting a status bit in the output image table 2 to a desired state.

There are three general types of program instructions executed by the processor 10. A program instruction which calls for an operation involving a selected status bit in either the output image table 2 or input image table 3 includes an eight-bit operand address which indicates the memory address of the word containing the desired status bit and a four-bit pointer that identifies which of the sixteen bits in the addressed word is selected. Such program instructions are referred to hereinafter as status bit instructions and they include the following:

TABLE I

| OPERATION | OP CODE | | | | POINTER | | | | OPERAND ADDRESS | | | | | | | | Execution Time |
|---|---|---|---|---|---|---|---|---|---|---|---|---|---|---|---|---|---|
| XIC/XOE | 0 | 0 | 1 | 0 | P | P | P | P | A | A | A | A | A | A | A | A | |
| XIO/XOD | 0 | 0 | 1 | 1 | P | P | P | P | A | A | A | A | A | A | A | A | 2 usec. |
| OTU | 1 | 1 | 0 | 0 | P | P | P | P | A | A | A | A | A | A | A | A | |
| OTL | 1 | 1 | 0 | 1 | P | P | P | P | A | A | A | A | A | A | A | A | |
| OTD | 1 | 1 | 1 | 0 | P | P | P | P | A | A | A | A | A | A | A | A | 3 usec. |
| OTE | 1 | 1 | 1 | 1 | P | P | P | P | A | A | A | A | A | A | A | A | |
| INSTRUCTION BIT NUMBER (OCTAL) | 17 | 16 | 15 | 14 | 13 | 12 | 11 | 10 | 7 | 6 | 5 | 4 | 3 | 2 | 1 | 0 | |

The mnemonic operation codes for the status bit instructions are briefly defined as follows:
XIC - Examine status bit closed or, is the status bit in the input image table a logic 1 state?
XOE - Same as XIC, but refers to a status bit in the output image table.
XIO - Examine status bit open or, is the status bit in the input image table a logic 0 state?
XOD - Same as XIO, but refers to a status bit in the output image table.
OTU - If conditions are true latch status bit off, or to a logic 0 state, and if false do nothing.
OTL - If conditions are true latch status bit on, or to a logic 1 state, and if false do nothing.
OTD - If conditions are true turn status bit off and if conditions are false turn status bit on.
OTE - If conditions are true turn status bit on and if conditions are false turn status bit off.

A second general type of program instruction is executed by the processor 10 to perform either a control or logical function. Such instructions are referred to hereinafter as control instructions and are comprised solely of an operation code. They include the following:

TABLE II

| OPERATION | OPERATION CODE | | | | | | | | | | | | | | | | | Execution Time |
|---|---|---|---|---|---|---|---|---|---|---|---|---|---|---|---|---|---|---|
| NOP | 0 | 0 | 0 | 0 | 0 | 0 | 0 | 0 | 0 | 0 | 0 | 0 | 0 | 0 | 0 | 0 | |
| BND | 0 | 0 | 0 | 0 | 1 | 1 | 1 | 1 | 1 | 1 | 1 | 1 | 1 | 1 | 1 | 1 | |
| BST | 0 | 0 | 0 | 1 | 1 | 1 | 1 | 1 | 1 | 1 | 1 | 1 | 1 | 1 | 1 | 1 | 1 usec. |
| END | 0 | 0 | 1 | 1 | 1 | 1 | 1 | 1 | 1 | 1 | 1 | 1 | 1 | 1 | 1 | 1 | |
| NOP 1 | 1 | 1 | 1 | 1 | 1 | 1 | 1 | 1 | 1 | 1 | 1 | 1 | 1 | 1 | 1 | 1 | |
| INSTRUCTION BIT NUMBER (OCTAL) | 17 | 16 | 15 | 14 | 13 | 12 | 11 | 10 | 7 | 6 | 5 | 4 | 3 | 2 | 1 | 0 | |

The mnemonic operation codes for the control instructions are briefly defined as follows:
NOP - No operation (all bits zero)
BND - Branch end: termination of a Boolean branch
BST - Branch start: opens or begins a Boolean subbranch
END - End of the control program
NOP - No operation (all bits one)

A third general type of control program instruction is executed by the processor 10 to operate on a data word stored in the memory 1. These instructions are referred to hereinafter as transfer and arithmetic instructions and are characterized by an operand address which indicates the address of a word in the memory 1. These instructions are particularly pertinent to the present invention in that they facilitate the transfer of sixteen-bit words between the input and output image tables 2 and 3 and the data table 4.

TABLE III

| OPERATION | OPERATION CODE | | | | | | | | OPERAND ADDRESS | | | | | | | | Execution Time |
|---|---|---|---|---|---|---|---|---|---|---|---|---|---|---|---|---|---|
| PUT | 0 | 1 | 0 | 0 | X | 0 | 1 | X | | | | | | | | | |
| GET | 1 | 0 | 0 | 0 | X | 0 | 1 | X | | | | | | | | | 2 usec. |
| EQU | 1 | 0 | 1 | 0 | X | 0 | 1 | X | | | | | | | | | |
| LES | 1 | 0 | 1 | 1 | X | 0 | 1 | X | | | | | | | | | |
| INSTRUCTION BIT NUMBER (OCTAL) | 17 | 16 | 15 | 14 | 13 | 12 | 11 | 10 | 7 | 6 | 5 | 4 | 3 | 2 | 1 | 0 | |

The mnemonic operation codes for the above arithmetic instructions are briefly defined as follows:
PUT - If conditions are true write the number stored in the processor data accumulator in the selected memory line, otherwise, do nothing.
GET - Fetch the word on the selected memory line and store in the processor data accumulator.
EQU - Is the value stored in the processor data accumulator equal to the value stored on the selected memory line?
LES - Is the value stored in the processor data accumulator less than the value stored on the selected memory line?

Reference is made to the above cited patent entitled "Programmable Logic Controller" for a more complete description of the structure of the processor 10 and the manner in which it functions to execute each of the above types of program instructions.

An I/O scanner circuit 12 serves to couple data between the image tables 2 and 3 and eight interface racks (only two of which are shown in the drawings and indicated at 13 and 14). The I/O scanner circuit 12 connects to the memory data bus 9, the memory address bus 6 and the read/write line 7. It also connects to the processor 10 through an interrupt request line 16 and a grant line 17. The I/O scanner 12 periodically steals a memory cycle from the processor 10, during which it either writes a sixteen-bit data word into an addressed line of the input image table 3 or reads a sixteen-bit data word from an addressed line in the output image table 2. Each line in the output image table 2 corresponds with an I/O module in one of the interface racks and each status bit in the output image table 2 corresponds with a single operating device such as a motor starter or solenoid on the equipment being controlled. Similarly, each line in the input table 3 corresponds with an I/O module in one of the controller interface racks and each status bit therein corresponds with a sensing device such as a limit switch or a photoelectric cell on the equipment being controlled. The input/output scanner circuit 12 functions to sequentially couple each I/O module to its corresponding line in the input image table 3. This is accomplished by a series of data output sequences in which the scanner 12 interrupts the processor 10, reads a word from the output image table 2 and couples that word to the appropriate I/O module, and by a series of input sequences in which a word is received from the same I/O module, the processor 10 is interrupted, and the received word is written into the corresponding line in the input image table 3. These functions are performed in rapid sequence on each I/O module to continuously refresh, or update, the status of the input image table 3 with the status of the sensing devices connected to the controller and to continuously maintain the operating devices connected to the controller in the state indicated by the output image table 2. For a more detailed description of the structure and operation of the input/output scanner circuit 12, reference is made to the above cited patent entitled "Programmable Logic Controller".

The input/output scanner circuit 12 connects to each of the interface racks 13 and 14 through a sixteen-bit I/O data bus 18 and a six-bit I/O address bus 19. A set of control lines 20 also connect between the I/O scanner circuit 12 and the interface racks 13 and 14. Each interface rack 13 and 14 includes a rack adapter 21 and a set of eight input/output modules which are separately identified as I/O slots 0-7. The rack adapter 21 in each interface rack 13 and 14 connects to the I/O data bus 18, I/O address bus 19, and the control lines 20, and in response to a six-bit address on the bus 19, it enables one of the associated eight I/O slots by generating a logic high voltage through one of eight slot address, or enable lines 22. A sixteen-bit data word on the bus 18 is then coupled through the rack adapter 21 and a sixteen-bit rack data bus 23 to the enabled I/O slot, or a sixteen-bit data word is coupled through the rack adapter 21 from the enabled I/O slot to the I/O data bus 18.

In response to signals received from the input/output scanner circuit 12 through the control lines 20, each rack adapter 21 selectively generates three control signals to the I/O slots. More specifically, a DATA IN signal is generated thereby on a line 24 when data is coupled to the enabled I/O slot, a DATA REQUEST signal is generated thereby on a line 25 when data is to be coupled from the enabled I/O slot, and a RESET signal is generated thereby on a line 25 when data is to be coupled from the enabled I/O slot, and a RESET signal is generated thereby on a line 26 when all operating devices connected to an enabled I/O slot are to be deenergized. Reference is made to the above cited patent entitled "Programmable Logic Controller" for a more detailed description of the structure and operation of the rack adapters 21.

Each I/O slot in the interface racks 13 and 14 typically contains an I/O module with sixteen separate input or output circuits. The input circuits each receive a one-bit signal from a sensing device on the controlled machine, convert that signal to a logic signal of the proper voltage level, and couple it to the bi-directional rack data bus 23 when the I/O slot is addressed, or enabled, through a line 22 and a DATA REQUEST signal is received on the line 25. The output circuits, on the other hand, each connect to drive an operating device on the machine being controlled. Upon receiving a DATA IN signal on the line 24, an output circuit in an addressed, or enabled, I/O slot controls the operation of its associated operating device by energizing or deenergizing it in response to a one-bit digital signal on the rack data bus 23. The input and output circuits also include extensive noise filtering circuitry and provide optical isolation between the controller circuitry and the sensing devices and operating devices to which they connect.

Figure 2:
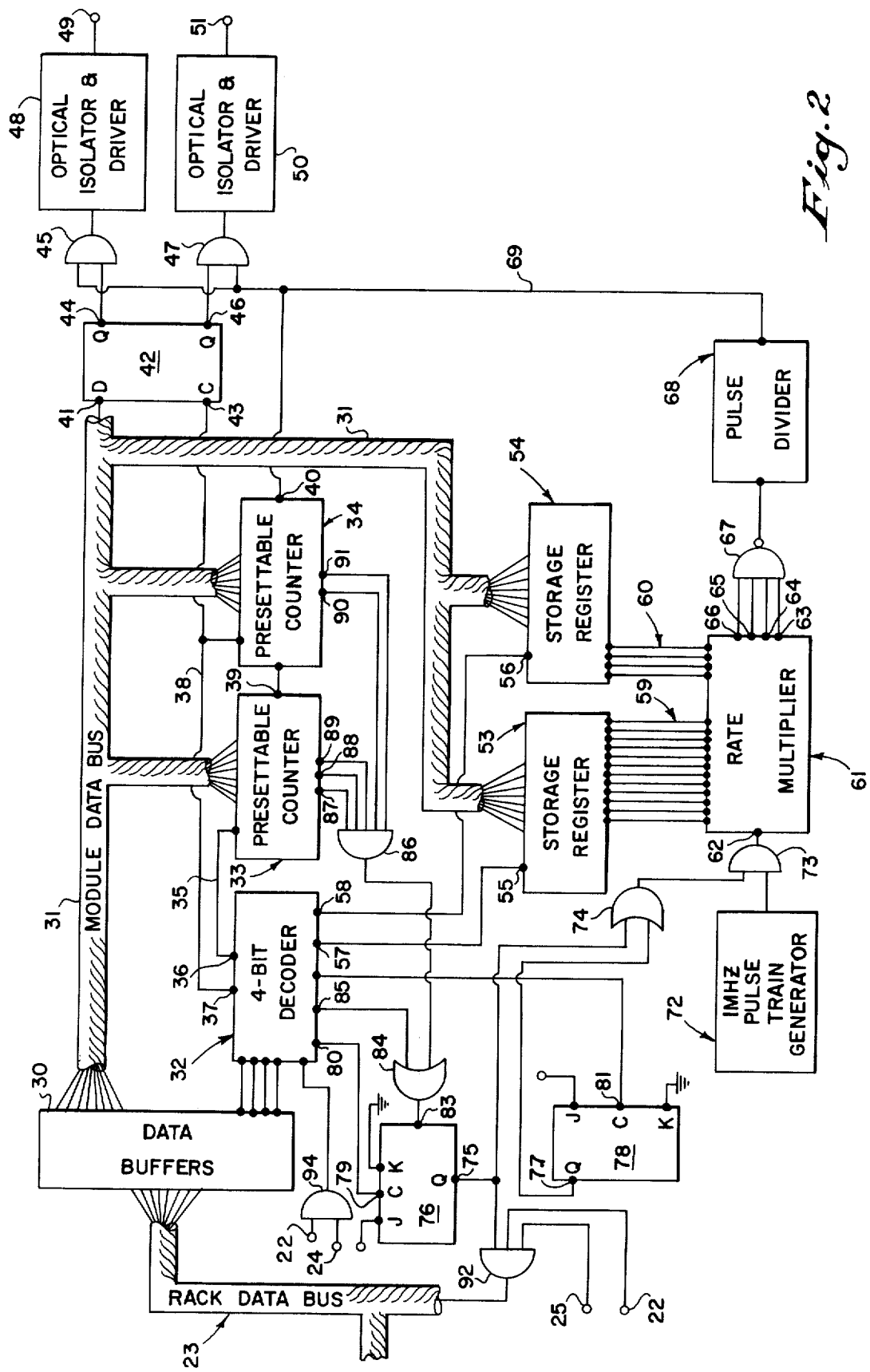
FIG. 2 is an electrical schematic diagram of a pulse module which incorporates the present invention.

Referring to FIG. 2, a pulse module suitable for driving a stepping motor is shown and may be inserted into one of the I/O slots in either of the interface racks 13 and 14. The pulse module connects to each of the sixteen leads in the rack data bus 23 and a sixteen-bit data word thereon is coupled through a set of sixteen data buffers 30 to a twelve-bit module data bus 31 and a four-bit decoder circuit 32. The data buffers are inverter gates such as SN7404 manufactured and sold commercially by Texas Instruments, Inc. and the four-bit decoder 32 is a four-line-to-ten-line decoder such as SN7442 also manufactured and sold commercially by Texas Instruments, Inc. The twelve-bit module data bus 31 connects to a first presettable counter 33 and a second presettable counter 34. The first presettable counter 33 is comprised of three four-bit synchronous up/down counters such as SN74190 manufactured by Texas Instruments, Inc., and the second presettable counter 34 is comprised of two such four-bit counters. The twelve-input terminals on the presettable counter 33 connect to the respective leads in the module data bus 31 and a load terminal on each of the four-bit counters therein connects through a lead 35 to an output terminal 36 on the four-bit decoder 32. The eight input terminals on the second presettable counter 34 connect to the eight least significant digit leads in the module data bus 31 and the load terminals therein connect through a lead 38 to an output terminal 37 on the four-bit decoder 32. The enable and down/up terminals (not shown in the drawings) on the presettable counters 33 and 34 are conditioned such that when logic high voltage pulses are applied to respective clock terminals 39 and 40 on the presettable counters 33 and 34, the five-digit BCD number stored therein is decremented one count for each pulse.

The ninth least significant digit lead in the module data bus 31 connects to a D input 41 on a D-type flip-flop 42 which serves to store the sign of the number stored in the counters 33 and 34. the clock terminal on the flip-flop 42 connects to the lead 38 and it is, therefore, enabled concurrently with the second presettable counter 34. A Q output terminal 44 on the flip-flop 42 connects to one input on a first output AND gate 45 and a Q output terminal 46 connects to one input on a second output AND gate 47. The output of the first AND gate 45 connects through an optical isolator and driver circuit 48 to a forward pulse output terminal 49 and the output of the second AND gate 47 connects through a similar optical isolator and driver circuit 50 to a reverse pulse output terminal 51.

The twelve leads in the module data bus 31 connect to a first twelve-bit storage register 53 and the four least significant digit leads therein connect to a second four-bit storage register 54. Each register 53 and 54 is comprised of four-bit data latches such as SN74175 manufactured and sold commercially by Texas Instruments, Inc. The registers 53 and 54 each have a clock terminal 55 and 56 which connect to respective output terminals 57 and 58 on the four-bit decoder circuit 32. Twelve output terminals on the storage register 53 connect through leads 59 to a sixteen-bit rate multiplier circuit 61, and four output terminals on the register 54 connect thereto through leads 60. The rate multiplier 61 is comprised of four synchronous rate multipliers such as SN74167 manufactured and sold by Texas Instruments, Inc. The rate inputs on the synchronous rate multipliers are connected to the respective leads 59 and 60 and their clock terminals are commonly connected to a terminal 62. Output terminals 63-66 on the respective synchronous rate multipliers connect to inputs on a NAND gate 67 and the output of the NAND gate 67 connects to the input of a pulse divider circuit 68. The pulse divider circuit 68 is comprised of two divide-by-ten circuits such as SN74290 manufactured and sold by Texas Instruments, Inc. and the output thereof connects to a lead 69 which connects it with both the clock terminals 39 and 40 on the presettable counters 33 and 34 and with second inputs on the output AND gates 45 and 47.

The rate multiplier 61 is supplied with logic high voltage pulses from a one-megahertz pulse train generator 72. The output of the pulse train generator 72 couples to the input terminal 62 on the rate multiplier 61 through an AND gate 73 which is enabled by an OR gate 74. One input terminal on the OR gate 74 connects to a Q output terminal 74 on a J-K flip-flop 76 and a second input terminal on the OR gate 74 connects to a Q output terminal 77 on a second J-K flip-flop 78. The J terminals on the respective flip-flops 76 and 78 are connected to a source of logic high voltage and their respective K terminals are connected to circuit ground. A clock terminal 79 on the J-K flip-flop 76 connects to an output terminal 80 on the four-bit decoder circuit 32 and a clock terminal 81 on the J-K flip-flop 78 connects to an output terminal 82 on the four-bit decoder circuit 32. A reset terminal 83 on the J-K flip-flop 76 is driven by an OR gate 84 which has one input connected to an output 85 on the four-bit decoder circuit 32 and a second input connected to the output of an AND gate 86. Five inputs on the AND gate 86 are connected to the respective MAX/MIN terminals 87-91 on the five counters which comprise the presettable counter circuits 33 and 34.

In addition to driving the OR gate 74, the Q output terminal 75 on the J-K flip-flop 76 connects to one input on an AND gate 92. A second input on the AND gate 92 connects to the data request line 25 and a third input thereon connects to the slot enable line 22. An output terminal on the AND gate 92 connects to the most significant digit lead in the rack data bus 23.

The operation of the pulse module of FIG. 2 is controlled by the four-bit decoder circuit 32 which is enabled by an AND gate 94 when a logic high voltage appears on the slot enable line 22 and when a logic high voltage appears on the DATA IN control lead 24. When thus enabled, the four-bit decoder circuit 32 is responsive to a four-bit identification code in a received command word to generate a logic high voltage at one of its outputs and to thus enable one of the above described pulse module circuit elements. The command work include rate commands which indicate the speed at which a stepping motor is to be driven by the pulse module and position, or displacement commands which indicate the distance which the stepping motor is to be driven. The pulse module is also responsive to three special commands, namely, START, POSITION OVERRIDE, and STOP. The format of the various command words applied to the pulse module of FIG. 2 is a follows:

1 are required. The least significant rate command word is generated during the first output transfer and in response thereto the four-bit decoder circuit 32 generates a logic high voltage at its output 57 which enables the first storage register 53. As a result, the three least significant BCD digits which accompany the identification code and appear on the module data bus 31 are stored in the register 53. The most significant rate command word is transferred next and in response to the identification code therein the four-bit decoder circuit 32 generates a logic high at its output terminal 58. As a result, the most significant BCD digit appearintg on the module data bus 31 is clocked into the storage register 54. The four BCD digits stored in the registers 53 and 54 are applied to the rate multiplier circuit 61 through the leads 59 and 60 to control the rate at which pulses are gated through the rate multiplier 61 and generated on the lead 69 to the output AND gates 45 and 47. A range of from 0 to 9999 pulses per second is provided by the pulse module of the preferred embodiment.

The third command word received from the output image table 2 of the controller memory 1 is the least significant position command word. In response to the identification code in this received command word, the four-bit decoder circuit 32 generates a logic high voltage at its output 36 to enable the presettable counter 33

Least Significant Rate Command Word

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 1 | 1 | 1 | 0 | X | X | X | X | Y | Y | Y | Y | Z | Z | Z | Z |
| | Identification Code | | | | Third BCD Digit | | | | Second BCD Digit | | | | First BCD Digit | | | |

Most Significant Rate Command Word

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 1 | 1 | 0 | 0 | | | | | | | | | W | W | W | W |
| | | | | | | | | | | | | | Fourth BCD Digit | | | |

Least Significant Position Command Word

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 1 | 1 | 0 | 1 | X | X | X | X | Y | Y | Y | Y | Z | Z | Z | Z |
| | Identification Code | | | | Third BCD Digit | | | | Second BCD Digit | | | | First BCD Digit | | | |

Most Significant Position Command Word

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 1 | 1 | 1 | 1 | | | | 1/0 | V | V | V | V | W | W | W | W |
| | Identification Code | | | | | | | SIGN | Fifth BCD Digit | | | | Fourth BCD Digit | | | |

Start Command

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 0 | 1 | 1 | 0 | | | | | | | | | | | | |
| | Identification Code | | | | | | | | | | | | | | | |

Position Override Command

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 0 | 1 | 0 | 0 | | | | | | | | | | | | |
| | Identification Code | | | | | | | | | | | | | | | |

Stop Command

| Bit No. | 17 | 16 | 15 | 14 | 13 | 12 | 11 | 10 | 7 | 6 | 5 | 4 | 3 | 2 | 1 | 0 |
|---|---|---|---|---|---|---|---|---|---|---|---|---|---|---|---|---|
| Contents | 0 | 0 | 0 | 0 | | | | | | | | | | | | |
| | Identification Code | | | | | | | | | | | | | | | |

To completely define a motion, or event, which is to be performed by the pulse module, five output transfers from the output image table 2 of the controller memory through the lead 35. The three BCD digits which accompany the identification code and appear on the module data bus 31 are thus clocked into the presettable counter 33 to preset its contents. The most significant position command word is received next and in response to the identification code therein, the four-bit decoder circuit 32 generates a logic high at its output 37 to enable the presettable counter 34 and flip-flop 42 through the lead 38. The two most significant BCD digits which appear on the module data bus 31 are thus clocked into and preset the counter 34 and the sign bit is simultaneously clocked into the flip-flop 42. If the sign bit is a logic one, forward motion is indicated and a logic high voltage is generated at the Q output terminal 44 on the flip-flop 42 to enable the first output AND gate 45. As a result, pulses generated on the lead 69 are applied to the optical isolator and driver circuit 48 and hence to the output terminal 49. On the other hand, if the sign bit is a logic zero, the pulse train on the lead 69 is gated through the second output AND gate 47 to drive the stepping motor in the reverse direction.

The fifth command word received from the output image table 2 of the controller memory 1 is the start command. In response to the identification code in the start command word, the four-bit decoder circuit 32 generates a logic high voltage at its output 80 to set the J-K flip-flop 76. As a result, the Q output terminal 75 on the flip-flop 76 is set to a logic high voltage and this is coupled through the OR gate 74 to enable the AND gate 73. The one-megahertz pulse train is thus applied to the clock terminal 62 on the rate multiplier 61, and pulses are generated at one of the pulse module outputs 49 or 51. A logic high voltage at the Q output terminal 75 is also applied to the AND gate 92 to indicate to the controller processor 10 that the pulse module is busy. The function of this feature will become more apparent from the description which follows.

As pulses are generated on the lead 69 to one or the other of the output terminals 49 or 51, they are also applied to the clock terminals 39 and 40 on the presettable counters 33 and 34. As a result, the preset position, or displacement number stored in the counters 33 and 34 is decremented by the generated pulses. When the counters 33 and 34 are counted down to zero, logic high voltages are generated at each of the output terminals 87-91 to enable the AND gate 86. A logic high voltage is thus generated by the AND gate 86 and coupled through the OR gate 84 to the reset terminal 83 on the J-K flip-flop 76. When the desired number of pulses has been generated on the lead 69, the J-K flip-flop 76 is reset and the logic low voltage at its output terminal 75 disables the AND gate 73 to terminate the application of pulses to the rate multiplier 61. The AND gate 92 is similarly disabled to indicate to the controller processor 10 that the pulse module has completed execution of the event and that further rate and position command words can be coupled to the module. It should be apparent to those skilled in the art that appropriate acceleration and deceleration characteristics can be obtained by altering the rate at which pulses are applied to the rate multiplier 61.

This normal mode of operation can be altered by generating an override command word to the pulse module. In response to the identification code contained in the override command word, the four-bit decoder circuit 32 generates a logic high voltage at its output terminal 82 which sets the J-K flip-flop 78. The logic high voltage at its Q output terminal 77 is applied through the OR gate 74 to enable the AND gate 73 independently of the logic signal generated by the J-K flip-flop 76. Consequently, even though the presettable counters 33 and 34 are counted down to zero, the one megahertz pulse train will continue to be applied to the rate multiplier 61 and the stepping motor will continue to be driven by pulses generated at either output terminal 49 or 51.

If it becomes necessary to stop the motion of the stepping motor before the commanded event is completely executed, a stop command word is coupled to the pulse module. In response to the identification code in the stop command word, the four-bit decoder circuit 32 generates a logic high voltage at its output terminal 85 which resets the J-K flip-flop 76. Therefore, even if the presettable counters 33 and 34 have not reached zero, the event is terminated until a start command word is subsequently received.

Referring particularly to FIG. 1, the command words which operate the pulse module are stored in the data table 4 of the controller memory 1 and, as described above, the input/output scanner circuit 12 is operable to couple command words from the output image table 2 to the I/O modules in the interface racks 13 and 14. As a consequence, the pulse module command words stored in the data table 4 must each be transferred to the output image table 2 before it can be coupled to the pulse module by the input/output scanner circuit 12. Instructions contained in the control program 5 perform this transfer as will now be described. In the example to follow, the pulse module is inserted in slot 3 of the second I/O interface rack 14. As a consequence, the word located at octal address 023 in the output image table 2 corresponds, or is coupled to, the pulse module and the word located at the octal address 123 in the input image table 3 corresponds with the pulse module. All command words which are to be generated to the pulse module must, therefore, be written into memory address 023 and the status of the pulse module (busy or not busy) is stored as the most significant bit at memory address 123.

Referring particularly to FIG. 4, the five command words for directing a single movement of the pulse module are stored at respective memory addresses ABC, DEF, GHI, JKL and MNO in the data table 4. The following program stored in the control program portion 5 of the memory 1 employs three memory lines in the timers and counters portion of the controller memory 1 to sequentially transfer these command words from the data table 4 to the output image table 2.

| OP CODE | MEMORY ADDRESS | COMMENT |
| --- | --- | --- |
| XIO | 123 (16th bit) | Examine pulse module to determine if it has completed previous event. |
| XIC | xxx (xxxx xxx) | Examine condition of various devices on controlled equipment to determine whether pulse module can execute this motion. |
| " | " | |
| " | " | |
| XIC | TUV (16th bit) | Is the transfer start bit one? |

-continued

| OP CODE | MEMORY ADDRESS | COMMENT |
|---|---|---|
| OTL | TUV (1st bit) | If the above conditions are satisfied, latch step 1 bit. |
| XOE | TUV (1st bit) | If program is in step 1, start |
| TON | 2WX | timer. |
| XOE | TUV (1st bit) | If program is in step 1, unlatch |
| OTU | TUV (16th bit) | transfer start bit. |
| XOE | TUV (1st bit) | If program is in step 1, put least |
| GET | ABC | significant rate command word in |
| PUT | 023 | output image table. |
| XOE | TUV (1st bit) | When .1 seconds has elapsed in |
| XIC | 2WX (14th bit) | step 1, latch step 2 bit. |
| OTL | TUV (2nd bit) | |
| XOE | TUV (2nd bit) | If program is in step 2, unlatch |
| OTU | TUV (1st bit) | step 1 bit. |
| XOE | TUV (2nd bit) | If program is in step 2, start |
| TON | 2WX | timer. |
| XOE | TUV (2nd bit) | If program is in step 2, put most |
| GET | DEF | significant rate command word in |
| PUT | 023 | output image table. |
| XOE | TUV (2nd bit) | When .1 seconds has elapsed in |
| XIC | 2WX (14th bit) | step 2, latch step 3 bit. |
| OTL | TUV (3rd bit) | |
| XOE | TUV (3rd bit) | If program is in step 3, unlatch |
| OTU | TUV (2nd bit) | step 2 bit. |
| XOE | TUV (3rd bit) | If program is in step 3, start |
| TON | 2WX | timer. |
| XOE | TUV (3rd bit) | If program is in step 3, put least |
| GET | GHI | significant position command word |
| PUT | 023 | in output table. |
| XOE | TUV (3rd bit) | When .1 seconds has elapsed in |
| XIC | 2WX (14th bit) | step 3, latch step 4 bit. |
| OTL | TUV (4th bit) | |
| XOE | TUV (4th bit) | If program is in step 4, unlatch |
| OTU | TUV (3rd bit) | step 3 bit. |
| XOE | TUV (4th bit) | If program is in step 4, start |
| TON | ZWX | timer. |
| XOE | TUV (4th bit) | If program is in step 4, put most |
| GET | JKL | significant position command word |
| PUT | 023 | in output image table. |
| XOE | TUV (4th bit) | When .1 seconds has elapsed in |
| XIC | ZWX (14th bit) | step 4, latch step 5 bit. |
| OTL | TUV (5th bit) | |
| XOE | TUV (5th bit) | If program is in step 5, unlatch |
| OTU | TUV (4th bit) | step 4 bit. |
| XOE | TUV (5th bit) | If program is in step 5, get start |
| GET | MNO | command word and put in output |
| PUT | 023 | image table. |
| XOE | TUV (5th bit) | If program is in step 5, and if |
| XIC | 123 (16th bit) | pulse module is busy, latch step |
| OTL | TUV (6th bit) | 6 bit. |
| XOE | TUV (6th bit) | If program is in step 6, unlatch |
| OTU | TUV (5th bit) | step 5 bit. |
| XOE | TUV (6th bit) | If program is in step 6, put no |
| GET | YZA | operation word in output image |
| PUT | 023 | table. |
| XOE | TUV (6th bit) | If program is in step 6, and if |
| XIO | 123 (16th bit) | the pulse module has completed |
| OTL | TUV (16th bit) | commanded event, latch program start bit. |
| XOE | TUV (16th bit) | If program start bit is latched, |
| OTU | TUV (6th bit) | unlatch step 6 bit. |

It should be apparent that the above routine directs the pulse module to perform one motion. Other motions defined by similar routines having command words with different position and pulse rate values would follow. The order in which the motions are performed is determined by the set of XIC instructions at the beginning of each routine.

It should also be apparent from the above description that the command words are sequentially written into the appropriate line in the output image table 2 and must remain in the output image table 2 long enough to insure that the asynchronously operated input/output scanner circuit 12 has an opportunity to couple it to the pulse module in the interface rack 14. One tenth of one second as measured by the controller timer is more than sufficient time for this to occur at least once, and typically would allow multiple transfers to occur. It should also be apparent that the command words stored in the data table 4 are identifiable for the processor 10 by virtue of their unique location, or address, in the memory 1. On the other hand, the identification code in each command word is necessary to allow the pulse module to identify the nature of each command word as it is sequentially received from the output image table 2, and thus to allow the proper pulse module circuit element to be enabled.

Figure 3:
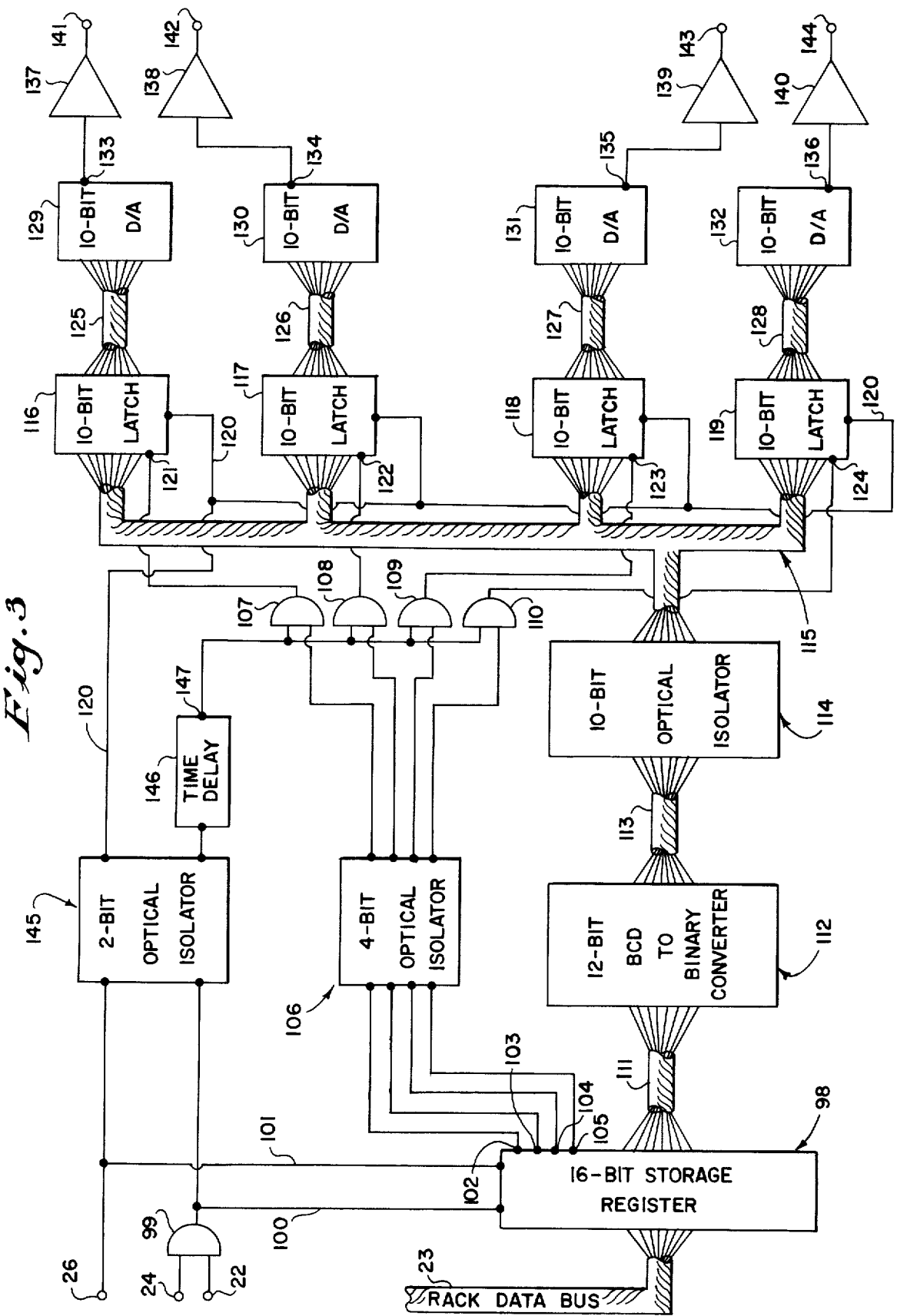
FIG. 3 is an electrical schematic diagram of an analog output module which incorporates the present invention.

The asynchronous coupling of data words between the memory of a programmable controller and a word oriented input/output module is not limited to pulse modules alone. Referring particularly to FIg. 3, an analog output module is shown which may be plugged into any one of the I/O slots of the controller interface racks. To make efficient use of the space available on the printed circuit board and thus to make efficient use of the space available in the interface rack which mounts the module printed circuit boards, four analog output circuits are serviced at a single I/O slot. As a result, each command word coupled to the analog output module from the controller memory includes an identification code which indicates the particular analog output circuit to which it applies.

Referring particularly to FIG. 3, the leads in the sixteen-bit rack data bus 23 connect to the inputs on a sixteen-bit storage register 98. The slot enable line 22 and DATA IN lead 24 connect to the inputs on an AND gate 99. The storage register 98 is comprised of two eight-bit bidirectional shift registers such as Model SN74198 manufactured by Texas Instruments, Inc., in which their clock terminals are commonly connected through a lead 100 to the output of the AND gate 99 and their reset terminals are commonly connected through a lead 101 to the reset lead 26 which eminates from the rack adapter 21. A four-bit identification code is associated with each command word received and stored in the register 98 and this identification code is generated at the four most significant digit output terminals 102-105 of the storage register 98. The output terminals 102-105 connect to the inputs of a four-bit optical isolator circuit 106 and the four-bit identification code is coupled therethrough to one input on each of four respective AND gates 107-110. The optical isolator 106 is comprised of two parallel connected dual high speed isolators such as Model 5082-4355 manufactured by Hewlett-Packard.

The twelve least significant digit outputs on the sixteen-bit storage register 98 connect through a bus 111 to the inputs of a twelve-bit BCD-to-binary converter circuit 112. The three BCD digits in each command word stored in the register 98 are thus converted to a ten-bit binary number which is generated at the output of the BCD-to-binary converter 112 and coupled through a bus 113 to a ten-bit optical isolator circuit 114. The optical isolator circuit 114 is comprised of five parallel connected dual high speed isolators such as those identified above. The ten electrically and physically isolated outputs of the ten-bit optical isolator 114 connect to respective leads in a data bus 115. The data bus 115 in turn connects to ten input terminals on each of four ten-bit latch circuits 116-119. Each ten-bit latch circuit 116-119 is comprised of a pair of six-bit data latches such as Model No. SN74174 manufactured by Texas Instruments, Inc., in which two inputs are connected to circuit ground. The latch circuits 116-119 have their reset terminals commonly connected to a reset line 120 and their respective clock terminals 121-124 connected to the output terminals of the respective AND gates 107-110. The ten output terminals on each of the latch circuits 116-119 connect through respective ten-bit buses 125-128 to the inputs of associated ten-bit digital-to-analog converter circuits 129-132. The digital-to-analog converter circuits 129-132 are each comprised of a twelve-bit digital-to-analog converter such as Model No. MP1412 which is commercially available from Analogic Corporation and in which the two least significant digits are connected to circuit ground. An output terminal 133-136 on each of the respective digital-to-analog converters 129-132 connects through respective amplifier circuits 137-140 to respective first-channel, second-channel, third-channel and fourth-channel analog output terminals 141-144.

The reset lead 26 couples through a two-bit optical isolator circuit 145 to operate the reset line 120 and the output of the AND gate 99 connects through the same two-bit optical isolator 145 to operate a time delay circuit 146. The optical isolator 145 is identical to those described above and the time delay circuit 146 is a monostable multivibrator which generates a logic high pulse at an output terminal 147 five microseconds after a logic high voltage is received at its input. The output terminal 147 on the time delay circuit 146 connects to second input terminals on each of the AND gates 107-110.

When a command word is received at the I/O slot which contains the analog output module of FIG. 3, it is clocked into and stored in the sixteen-bit storage register 98 by the DATA IN signal and SLOT ENABLE signal concurrently applied to the AND gate 99. The format of the command words for each of the four channels of the analog output module is as follows:

| Channel No. | I.D. Code | | | | Data |
|---|---|---|---|---|---|
| | 17 | 16 | 15 | 14 | 13 12 11 10 7 6 5 4 3 2 1 0 |
| 1 | 0 | 0 | 0 | 1 | 3 digit BCD number |
| 2 | 0 | 0 | 1 | 0 | 3 digit BCD number |
| 3 | 0 | 1 | 0 | 0 | 3 digit BCD number |
| 4 | 1 | 0 | 0 | 0 | 3 digit BCD number |

The identification code in the command word stored in the register 98 is coupled through the optical isolator 106 to enable one of the AND gates 107-110. The delayed pulse generated by the time delay circuit 146 is thus gated through the enabled AND gate 107-110 to clock the appropriate ten-bit data latch 116-119. The three-digit BCD number associated with the identification code is converted to a ten-bit binary number and coupled through the isolator 114 and data bus 115 to the enabled ten-bit data latch 116-119. The ten-bit binary number thus stored is converted to an analog output voltage level by the associated digital-to-analog converter circuit 129-132 and is generated at the associated analog output terminal 141-144. The ten-bit binary number is retained in the data latch 116-119 until a new ten-bit binary number is entered by a subsequently received command word containing the same identification code, or until a logic high reset pulse is generated on the lead 120. The identification code in each received command word thus serves to channel the associated multi-bit digital number to the proper digital-to-analog converter.

A pulse generator module and an analog output module have been described. It should be apparent, however, that numerous other types of word-oriented input-/output modules may be employed. Numerous variations can also be made from the specific embodiments of the invention described herein without departing from the spirit of the invention and reference is made to the following claims for interpreting the breadth of the invention.

We claim:

1. A programmable controller, the combination comprising:
  a memory which includes a set of command words in a data table, which includes an output image table, and which includes a control program;
  an input/output scanner circuit coupled to said memory and being operable to periodically read a command word from a selected location in said output image table out of said memory, to couple said command word to a data bus, and to generate a selected address which is associated with the selected location in said output image table and to couple said selected address to an address bus;
  an input/output module coupled to said address bus and being enabled by said selected address, the input/output module including:
    (a) a plurality of circuit elements, each coupled to said data bus to receive a multi-digit number contained within each of said command words; and (b) circuit means coupled to said data bus to receive an identification code contained within each command word, and in response thereto, to selectively enable one of said circuit elements to operate on the multi-digit number associated with the identification code; and a processor connected to said memory to execute said control program, said processor being operable in response to control program instructions to sequentially and selectively transfer command words from said data table to said selected location in said output image table.

2. The programmable controller as recited in claim 1 in which said input/output scanner circuit operates substantially independently from, and asynchronously with respect to said processor to periodically couple data from said selected location in said output image table to said input/output module, and in which there is a timer associated with said processor which determines the maximum rate at which selected ones of said command words are transferred to said selected location in said output image table, such that each command word transferred to said selected location in said output image table remains therein for a time interval which is preselected to insure that said input/output scanner circuit has sufficient time to couple it to said input/output module.

3. The programmable controller as recited in claim 1 in which said circuit elements include a plurality of digital-to-analog converters which are separately and selectively enabled by said circuit means to convert a multi-digit number to an analog output signal.

4. A programmable controller having a memory which stores command words and an input/output scanner circuit which periodically reads selected command words out of said memory and couples them through a data bus to an associated input/output module which is enabled by an address generated by said input/output scanner circuit and received on an address bus, said input/output module being suitable for driving a stepping motor and including:

a storage register coupled to said data bus to receive a multi-digit number contained within said command words and being operable to store a multi-digit number which indicates pulse rate;

a presettable counter coupled to said data bus to receive a multi-digit number contained within said command words and being operable to store a multi-digit number which indicates the number of pulses to be generated;

a pulse generator connected to said storage register and said presettable counter and being operable in response to the multi-digit numbers stored therein to generate the indicated number of pulses at the indicated pulse rate; and a decoder circuit connected to said data bus to receive an identification code contained within each command word, and in response thereto, selectively enable said storage register or said presettable counter to receive and store the multi-digit number associated with the identification code.

5. The programmable controller as recited in claim 4 in which said decoder circuit is responsive to a first identification code to enable the multi-digit number contained within the same command word to be stored in said storage register means, is responsive to a second identification code to enable the multi-digit number contained within the same command word to be stored in said presettable counter means, and is responsive to a third identification code to enable said pulse generator means to commence generating pulses.

6. The programmable controller as recited in claim 4 in which said pulse module includes means coupled to said presettable counter means for generating a busy signal when said pulse generator means is operating to generate pulses, and gate means having a first input coupled to said busy signal generating means, a second input coupled for operation by said input/output scanner circuit and an output terminal connected to said data bus, wherein said input/output scanner circuit periodically operates said gate means an couples said busy signal to said controller memory.

7. The programmable controller as recited in claim 6 in which said command words include unique identification codes and said input/output module includes decoding means which receives the identification code and establishes the nature of each command word being coupled to the input/output module by the input/output scanner circuit.

8. A programmable controller, the combination comprising:

a memory which stores on its lines a set of command words, an output image table and a control program;

an input/output module responsive to a received command word to perform an operation;

an input/output scanner circuit coupled to said memory and said input/output module and being operable to periodically and repeatedly read a word on a selected line in said output image table out of said memory and couple it to said input/putput module;

a processor connected to said memory to execute said control program at a rate which is independent of the rate at which said input/output scanner circuit reads said word from said memory and including means responsive to the control program for sequentially transferring command words to said selected line in said output image table and timer means for establishing a time period which is greater than the time period which elapses between successive readouts of the word at said selected line by said input/output scanner circuit, said timer means being coupled to said means for sequentially transferring command words for establishing the maximum rate at which said command words are transferred to said selected line of said output image table by said transfer means.

* * * * *

UNITED STATES PATENT OFFICE
CERTIFICATE OF CORRECTION

Patent No. 4,104,731      Dated August 1, 1978

Inventor(s) Raymond A. Grudowski and Odo J. Struger

It is certified that error appears in the above-identified patent and that said Letters Patent are hereby corrected as shown below:

| | |
|---|---|
| Column 2, line 66 | "A more" should start a new paragraph. |
| Column 3, line 11 | "be" should be -- by --. |
| Column 5, line 61 | after "input" add -- image --. |
| Column 5, line 67 | after "in the" add -- output image table 2 and its corresponding line in the --. |
| Column 7, lines 4-6 | delete "and a RESET signal is generated thereby on a line 25 when data is to be coupled from the enabled I/O slot,". |
| Column 8, line 9 | "Q" should be -- $\overline{Q}$ --. |
| Column 9, line 18 | "work" should be -- words --. |
| Column 9, line 26 | "is a follows" should be -- is as follows --. |
| Column 10, line 12 | "appearintg" should be -- appearing --. |

UNITED STATES PATENT OFFICE
CERTIFICATE OF CORRECTION

Patent No. 4,104,731           Dated August 1, 1978

Inventor(s) Raymond A. Grudowski and Odo J. Struger

It is certified that error appears in the above-identified patent and that said Letters Patent are hereby corrected as shown below:

Column 12, line 13     "one megahertz" should be -- one-megahertz --.

Column 14, line 57     "FIg." should be -- FIG. --.

Column 18, line 24     "an" should be -- and --.

*Signed and Sealed this*

*Thirteenth* Day of *February 1979*

[SEAL]

Attest:

RUTH C. MASON
*Attesting Officer*

DONALD W. BANNER
*Commissioner of Patents and Trademarks*